United States Patent [19]
Siddiqui et al.

[11] Patent Number: 5,699,938
[45] Date of Patent: Dec. 23, 1997

[54] MOLTEN THERMOPLASTIC MATERIAL SUPPLY SYSTEM WITH REMOVABLE DRIVE ASSEMBLY

[75] Inventors: Shahid A. Siddiqui, Roswell; Roger A. Ziecker, Lawrenceville; Karen M. Wagner, Norcross; Jocelyne Nassar, Tucker, all of Ga.

[73] Assignee: Nordson Corporation, Westlake, Ohio

[21] Appl. No.: 550,394

[22] Filed: Oct. 30, 1995

[51] Int. Cl.$^6$ ........................................... B67D 5/62
[52] U.S. Cl. ..................... 222/146.5; 29/426.1; 29/801; 219/421
[58] Field of Search ............... 222/146.1, 146.5, 222/333; 219/421; 414/219, 745.3; 29/426.1, 801

[56] References Cited

U.S. PATENT DOCUMENTS

| | | | |
|---|---|---|---|
| 3,964,645 | 6/1976 | Scholl | 222/146.5 |
| 4,666,066 | 5/1987 | Boccagno et al. | 222/146.5 |
| 4,948,017 | 8/1990 | Heep et al. | 222/368 |
| 5,076,317 | 12/1991 | DeWire et al. | 222/368 X |

*Primary Examiner*—Kevin P. Shaver
*Attorney, Agent, or Firm*—Rankin, Hill, Lewis & Clark

[57] ABSTRACT

A system for supplying melted thermoplastic material to a dispenser comprises a hopper for storing the thermoplastic material, the hopper having an outlet. A heating grid is at the outlet of the hopper for heating and melting the thermoplastic material. A reservoir is provided into which the melted material flows from the grid. A manifold assembly is connected to the reservoir. The melted material flows into the manifold assembly from the reservoir. The manifold assembly includes connections for supplying the material to a dispenser. The manifold assembly also includes a pump cavity. A pump is mounted in the pump cavity and is capable of being removed from the pump cavity. A drive assembly is connected to drive the pump. A movable carriage supports the drive assembly. The carriage is capable of movement toward and away from the manifold assembly to remove the pump from the cavity and to replace the pump into the cavity. In addition, a positioning and moving device may be used to connect the pump to the pump cavity. The positioning and moving device is adapted for pushing the pump from the pump cavity when the pump is removed and for pulling the pump into the pump cavity when the pump is replaced. The system allows the pump to be easily removed from the system and replaced without disconnecting the pump from the drive assembly.

15 Claims, 7 Drawing Sheets

MOLTEN THERMOPLASTIC MATERIAL SUPPLY SYSTEM WITH REMOVABLE DRIVE ASSEMBLY

BACKGROUND OF THE INVENTION

1. Field of the Invention

This invention relates to apparatus for melting and supplying thermoplastic materials to a dispensing system.

2. Description of the Prior Art

Thermoplastic materials or so-called "hot melt" materials have been used for many years for various purposes, including as adhesives in the manufacturing of products such as disposable diapers and in the manufacturing of packaging. Historically, the thermoplastic material was converted from a solid to a molten state in a tank having heated walls. The melted material was maintained in the molten state in the tank in sufficient volume to supply one or more applicators or dispensers. If the job or application required a substantial volume of hot melt material, a substantially large volume of material was required to be maintained in the molten or melted state, necessitating a long warm up or start up time for the apparatus, as well as prolonged exposure of at least some of the molten material to heat and/or to oxygen.

To avoid these problems, so-called grid-type hot melt supply systems were developed in which the solid thermoplastic material was stored in a hopper and melted upon the top of a heated grid located at the bottom of the hopper. The melted material then passed through holes in the grid into a relatively small holding reservoir from which the molten material was supplied by a pump beneath the reservoir to a dispenser. Grid-type supply systems have been capable of melting and supplying thermoplastic material at a very high rate, and the molten material is not maintained in a molten state for prolonged periods of time to char, oxidize, or otherwise degrade. A typical grid type hot melt supply system is disclosed in U.S. Pat. No. 3,946,645.

These grid-type hot melt supply systems have typically comprised a reservoir with a heated grid mounted on top of the reservoir. A hopper for receiving the solid thermoplastic material was mounted atop the heated grid. Mounted beneath the reservoir was at least one pump for pumping the molten thermoplastic material through one or more supply hoses which were connected to the pump. A flow passage was provided from the reservoir outlet to the pump inlet.

One problem with these hot melt supply systems has been that, in use, various extraneous objects or impurities could enter the hopper. Larger objects and impurities were prevented from passing through the openings in the grid, but smaller objects could pass through the grid and eventually reach the pump, resulting in periodic failure or clogging of the pump. If the pump failed or became clogged, it had to be removed so that it could be repaired or replaced.

To avoid draining the system of the thermoplastic material if the pump needed to be removed, a manually operated gate-type valve was sometimes located in the molten thermoplastic flow path between the reservoir outlet and the pump. An example of such a valve is shown in U.S. Pat. No. 4,666,066. This valve made it possible to stop the flow of molten thermoplastic material to the pump whenever the pump needed to be removed, and the pump could then be removed without the necessity of first draining the entire reservoir of molten thermoplastic material. Another example of a flow shutoff valve that could be used to shut off the flow of material to the pump is shown in U.S. Pat. No. 4,667,850.

Removal of the pump has still been difficult because the motor for driving the pump had to be disconnected from the pump in the course of removing the pump from the system. To facilitate quick disconnection of the driving motor from the pump, U.S. Pat. No. 4,666,066 also discloses the provision of a motor mount to enable the pump to be more quickly removed from the system. This has been accomplished by mounting the drive motor apart or remote from the pump and by connecting the motor to the pump by means of a drive belt or chain. The motor was mounted upon a mount plate which was pivotally connected to a supporting element by a bolt about which the plate was pivotable. The plate was locked by a second bolt in an adjusted position in which the drive belt or chain was taut. To disconnect the drive motor from the pump, the second bolt was loosened, the mounted plate was pivoted so as to put slack in the drive belt or chain, the belt or chain was removed from its connection with the pump.

This drive connection made it easier to remove the pump, but it required that the drive assembly be disconnected from the pump whenever it was necessary to remove the pump for service, repair or replacement. Furthermore, the pump had to be reconnected to the drive assembly when it was reassembled. This added to the time required to remove and to replace the pump, and thus added to system downtime. The removal and replacement of the pump thus still result in long downtimes of the supply system, adversely affecting the efficiency of the supply system.

SUMMARY OF THE INVENTION

The present invention provides a unique mechanism for mounting the pump and the drive motor which permits the pump to be easily and quickly removed for repair and replacement. In accordance with the present invention, the pump is mounted in a pump cavity in the manifold block. The rearward end of the pump cavity is open to permit the pump to be withdrawn from the cavity. The drive motor for the pump is mounted on a slidable carriage which allows the pump to be withdrawn from the pump cavity by moving the motor on the carriage away from the manifold block.

The pump is held in the pump cavity using a screw which also assists in pushing the pump out of the cavity when the pump is being removed. A seal on the pump casing engages the inside walls of the pump cavity, making it difficult to remove the pump. The positioning screw forces the pump from the pump cavity until the pump casing seal disengages from the cavity, and thus makes pump removal easier. When re-inserting the pump into the cavity, the screw facilities the positioning of the pump in the cavity, making it easier to pull the pump into place, and assuring that the alignment pin on the pump casing engages the respective hole in the pump casing so that the pump is positioned properly.

In accordance with the present invention, the pump is capable of being supported on the movable carriage after it is removed from the pump cavity, so that the pump can remain connected to the drive assembly throughout the removal process. When the pump is reinserted, it is loaded from the carriage support into the pump cavity, and it may not be necessary to disconnect the pump from the drive assembly when the pump is removed, such as for cleaning or service. This allows the system to be in use for a longer period by reducing system downtime, saving time and money.

The pump is connected to the drive assembly by a coupling which permits the pump to move longitudinally with respect to the drive assembly during the removal and replacement process. In addition, the coupling allows for misalignments between the drive assembly and the pump, so that the pump and drive assembly need not be positioned in exact alignment.

These and other advantages are provided by the present invention of a system for supplying melted thermoplastic material to a dispenser. The system comprises a hopper for storing the thermoplastic material. A heating grid is associated with the hopper for heating and melting the thermoplastic material. A reservoir is provided into which the melted material flows from the grid. A manifold assembly is connected to the reservoir. The melted material flows into the manifold assembly from the reservoir. The manifold assembly includes connections for supplying the material to a dispenser. The manifold assembly also includes a pump cavity. A pump is mounted in the pump cavity and is capable of being removed from the pump cavity. A drive assembly is connected to drive the pump. A movable carriage supports the drive assembly. The carriage is capable of movement toward and away from the manifold assembly to remove the pump from the cavity and to replace the pump into the cavity. In addition, a positioning and moving device in the form of a screw may be used to connect the pump to the pump cavity. The positioning and moving device is adapted for pushing the pump from the pump cavity when the pump is removed and for pulling the pump into the pump cavity when the pump is replaced.

DETAILED DESCRIPTION OF THE PREFERRED EMBODIMENT

Figure 1:
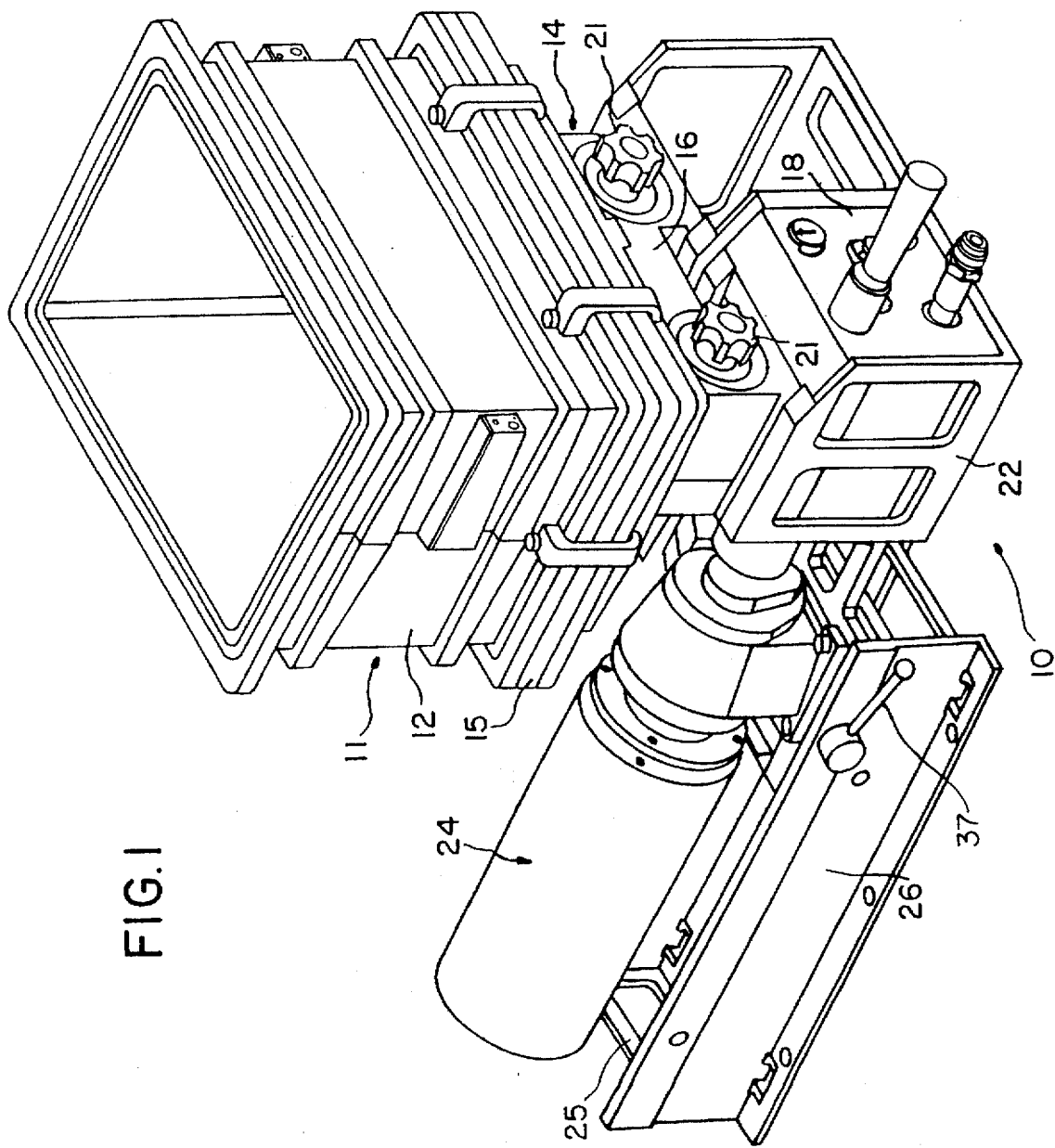
FIG. 1 is a perspective front view of the thermoplastic supply system of the present invention, with the support structure omitted.
Figure 2:
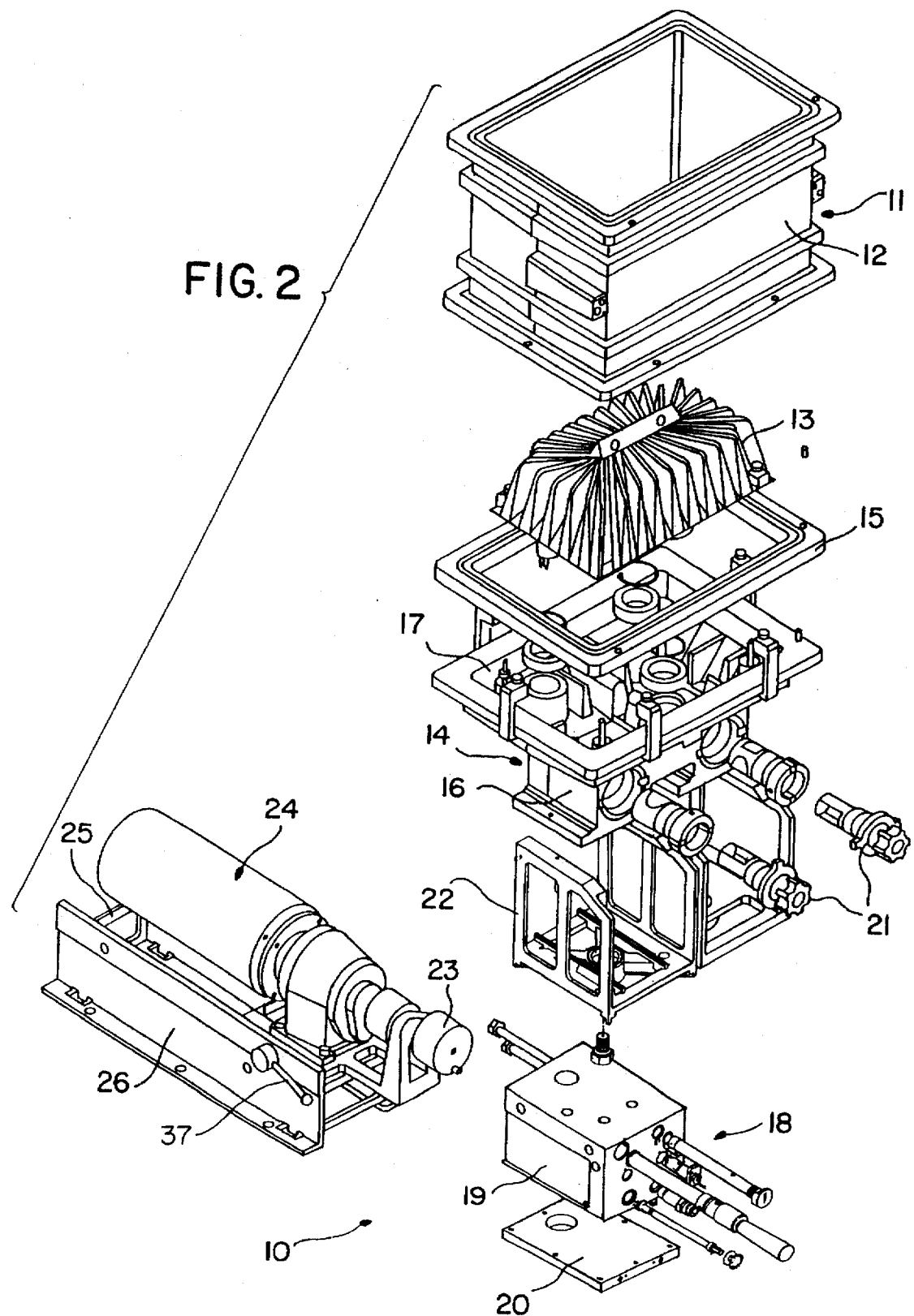
FIG. 2 is an exploded perspective front view of the thermoplastic supply system of FIG. 1.

Referring more particularly to the drawings and initially to FIGS. 1 and 2, there is shown the thermoplastic material supply system 10 of the present invention. The system is used for various purposes, such as to apply hot melt adhesive in a manufacturing line for specific products, such as for disposable diapers. A manufacturing line of disposable diapers may include, by way of example, a station for applying adhesive to the left and right leg elastic, to the waist elastic attachment and to the cuff elastic. The supply system 10 is connected to dispensers or applicators located at the manufacturing line by means of heated supply hoses. Various types of dispensers or applicators may be in the manufacturing line to apply the material, and these dispensers are not part of this invention. The supply system 10 is used to heat the solid thermoplastic material and to supply the molten material through various numbers of supply hoses to the dispensers.

The system 10 comprises a hopper assembly 11 for receiving and storing a supply of solid thermoplastic material. The hopper assembly 11 comprises one or more hopper units 12. The top of the hopper assembly 11 is open, allowing solid thermoplastic material to be placed in the hopper assembly. The bottom of the hopper assembly 11 is also open providing an outlet, and a heating grid 13 is mounted within the outlet of the hopper assembly. The heating grid 13 is used to melt the solid thermoplastic material in the hopper. Although the grid 13 is not in the form of a grid in the conventional definition of the term, since it is in the form of a pyramid-shaped cast block, it replaces the heating grids used in prior art systems, so it is called a "grid." The hopper assembly 11 is supported on a reservoir assembly 14 located below the hopper assembly 11, with a ceramic isolator 15 mounted therebetween. The reservoir assembly includes a block 16, the upper surface of which forms a reservoir 17 which receives a supply of melted material from the hopper assembly 11. Inside the reservoir block 16 are a pair of passageways through which the molten thermoplastic flows from the reservoir to a pair of manifold assemblies 18 positioned beneath the reservoir block. (Only one of the manifold assemblies is shown in FIGS. 1 and 2.) Each manifold assembly 18 includes a manifold block 19. The manifold block 19 may include an internal heater or may be heated by means of a separate attached heater plate 20. The reservoir assembly 14 includes a pair of flow shutoff valves 21 mounted in the reservoir block 16 each of which allows the flow of molten material through one of the passageways to one of the manifold assemblies to be shut off. Each of the flow shutoff valves 21 also includes a filter or protection screen to prevent extraneous particulate material from reaching the pump. The manifold assemblies 18 are inserted into a manifold harness or saddle 22 which is suspended from the bottom of the reservoir block 16. The manifold assembly is inserted into the harness and held securely against the reservoir block by means of a screw jack assembly. A pump 23 is adapted to be inserted into each of the manifold assemblies 18. Each of the pumps 23 is connected to a drive assembly 24, and the pump and the drive assembly are mounted on a horizontally moveable carriage 25 which moves on a carriage support 26. Each of the manifold assemblies 18 includes a connection for one or more supply hoses (not shown). The molten thermoplastic material is pumped from the manifold assembly 18 to dispensing heads through the supply hoses.

Figure 3:
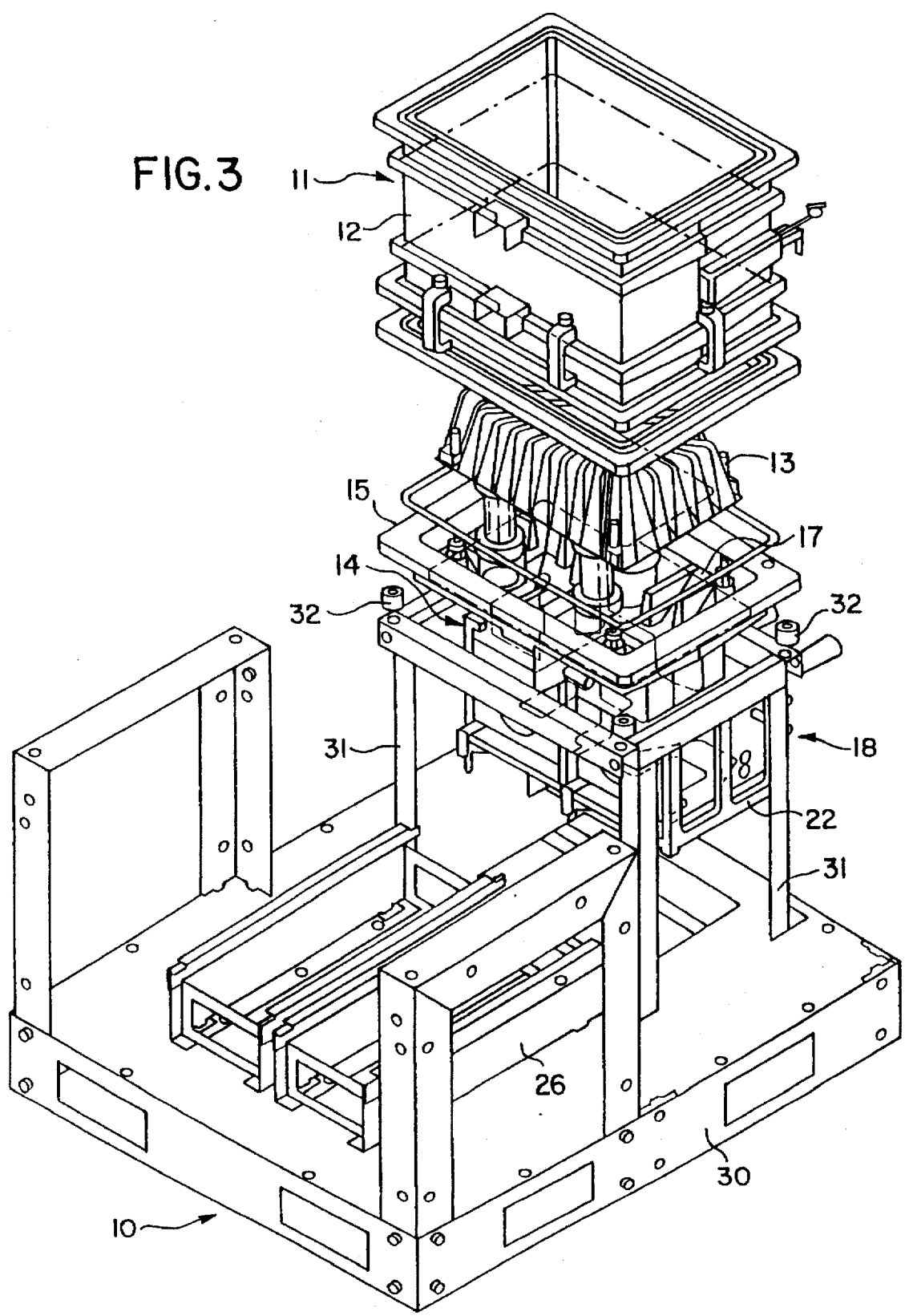
FIG. 3 is another exploded perspective view of the thermoplastic supply system of FIGS. 1 and 2 taken from the rear of the system with the support structure included, but with the drive assembly removed.

The support structure for the supply system 10 is not shown in FIGS. 1 and 2 for the sake of clarity, but it is depicted in FIG. 3. As shown in FIG. 3, the supply system 10 is supported on a base 30 upon which a upstanding frame 31 is mounted. The carriage support 26 is also mounted on the base 30. The reservoir block 16 is supported on the frame 31 with a plurality of isolating spacers 32 mounted therebetween.

While two flow shutoff valves, two manifold assemblies, and two pumps and drive assemblies are shown or described, this is intended to show a typical configuration of the system, and it should be understood that one or more of each of these elements could be used.

As used herein, the "front" of the system 10 and its components is considered to be the side of the system extending forward and to the right in FIGS. 1 and 2, which is also the side from which the shutoff valves 21 are mounted. The "rear" of the system 10 and its components is considered to be the opposite side, that is, the side extending back and to the left in FIG. 1 and 2, which is also the side from which the drive assembly 24 extends.

Figure 4:
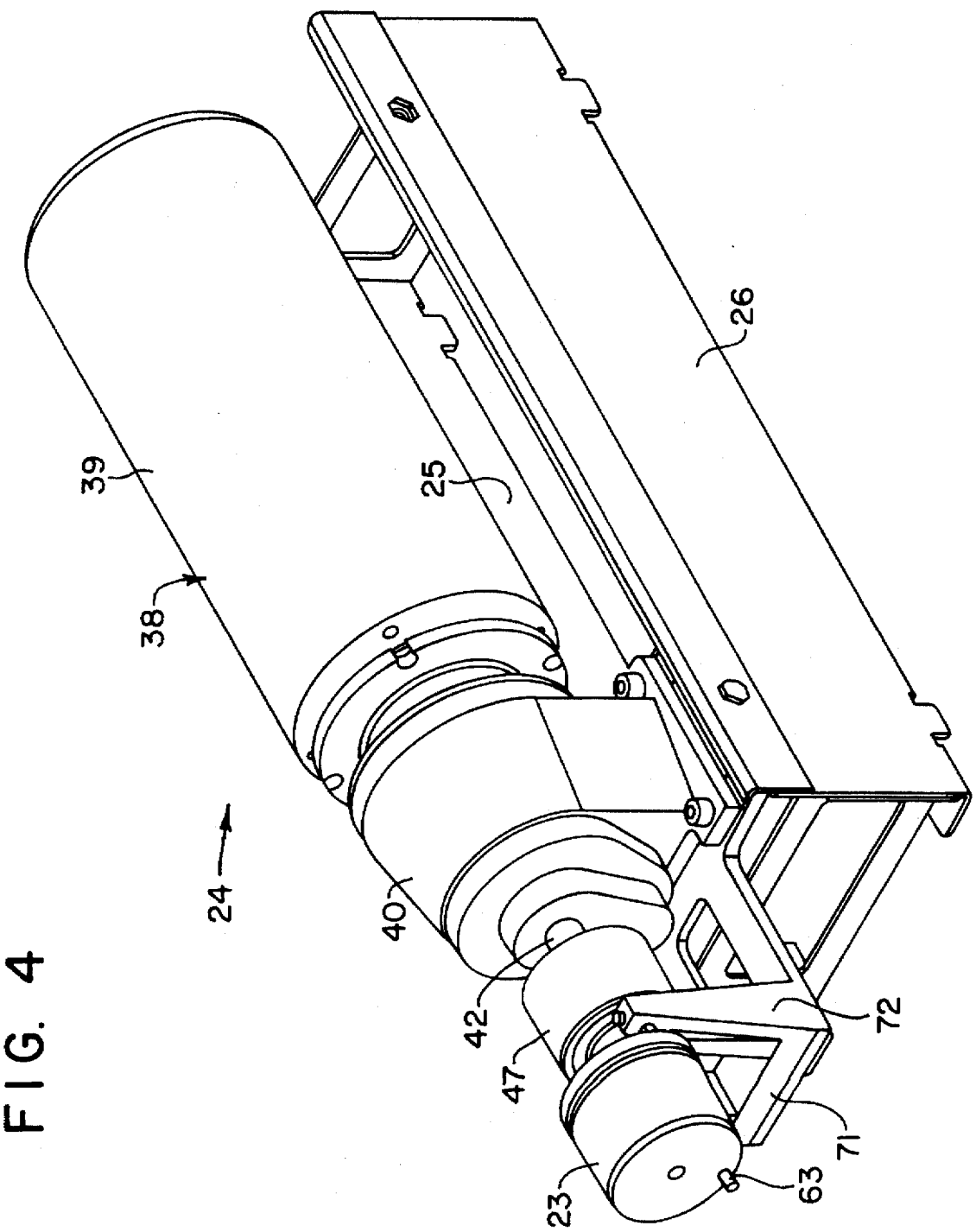
FIG. 4 is a detailed perspective view of the drive assembly of FIG. 1 removed from the system.

The drive assembly 24 includes the carriage 25 which is slidably mounted on the carriage support 26 which extends on the base 30 traversely from the rear of the manifold assembly 18. The position of the carriage 25 with respect to the carriage support 26 can be locked by means of a brake which is actuated by a lever arm 37. As shown in FIG. 4, the drive assembly 24 comprises a suitable electric motor assembly 38 which includes a motor 39 having an output shaft and a gear reducer 40 connected to the output shaft and adapted to reduce the motor speed and increase the torque. The reducer 40 is rigidly mounted to the carriage 25, and the motor 39 is thereby mounted on the carriage through its conection to the reducer. The motor 39 is connected to the control system by lines (not shown) to operate the motor and control the speed of the pumps which regulates the flow to the dispenser. The drive shaft 42 extends from the gear reducer 40.

Figure 5:
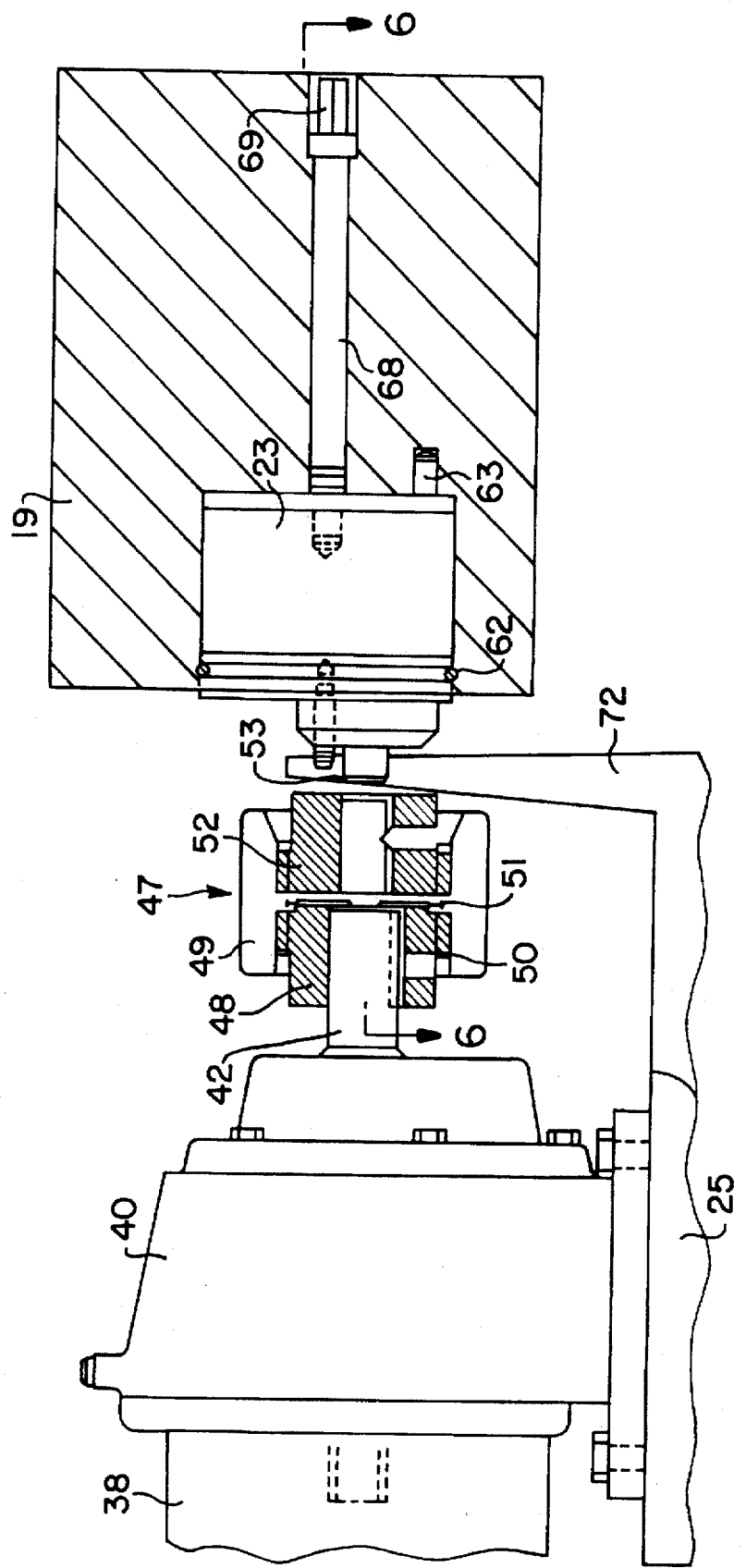
FIG. 5 is a side sectional view of a portion of the drive assembly and the manifold assembly showing the connection of the drive assembly to the pump.
Figure 6:
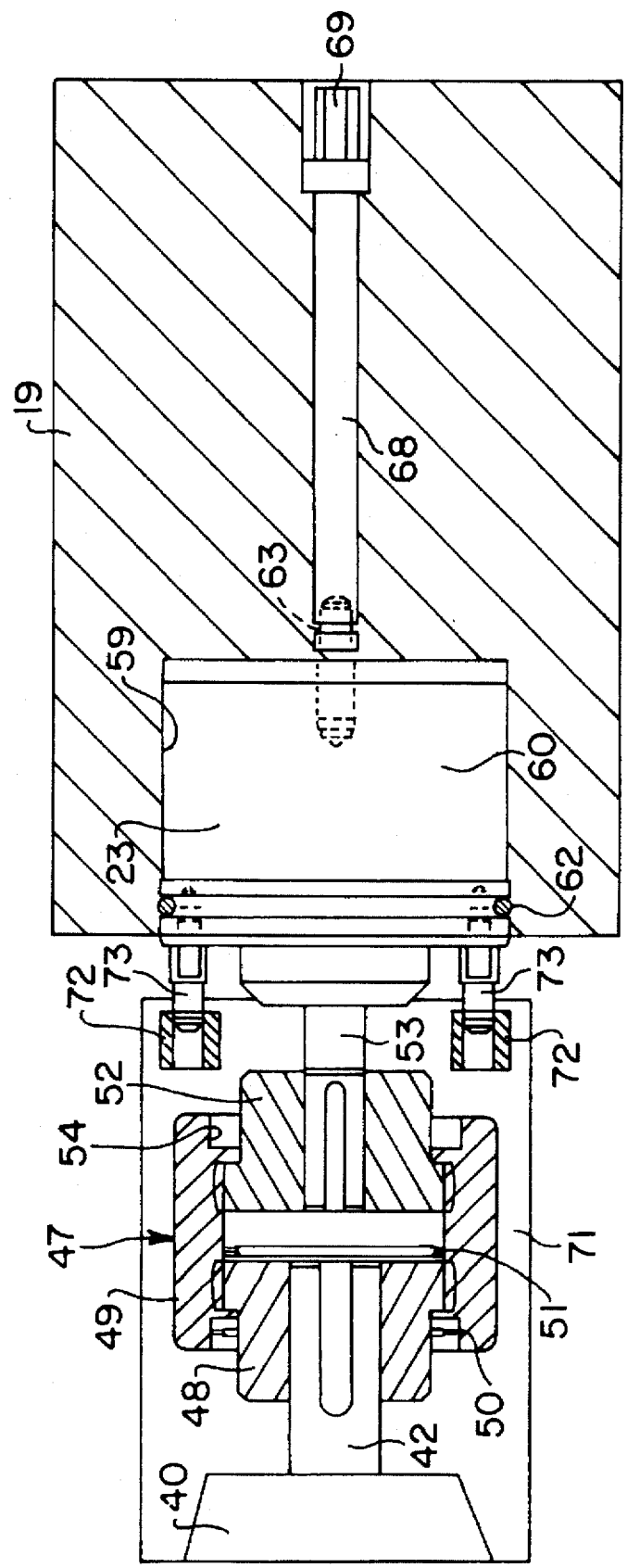
FIG. 6 is a top sectional view taken along line 6—6 of FIG. 5.
Figure 7:
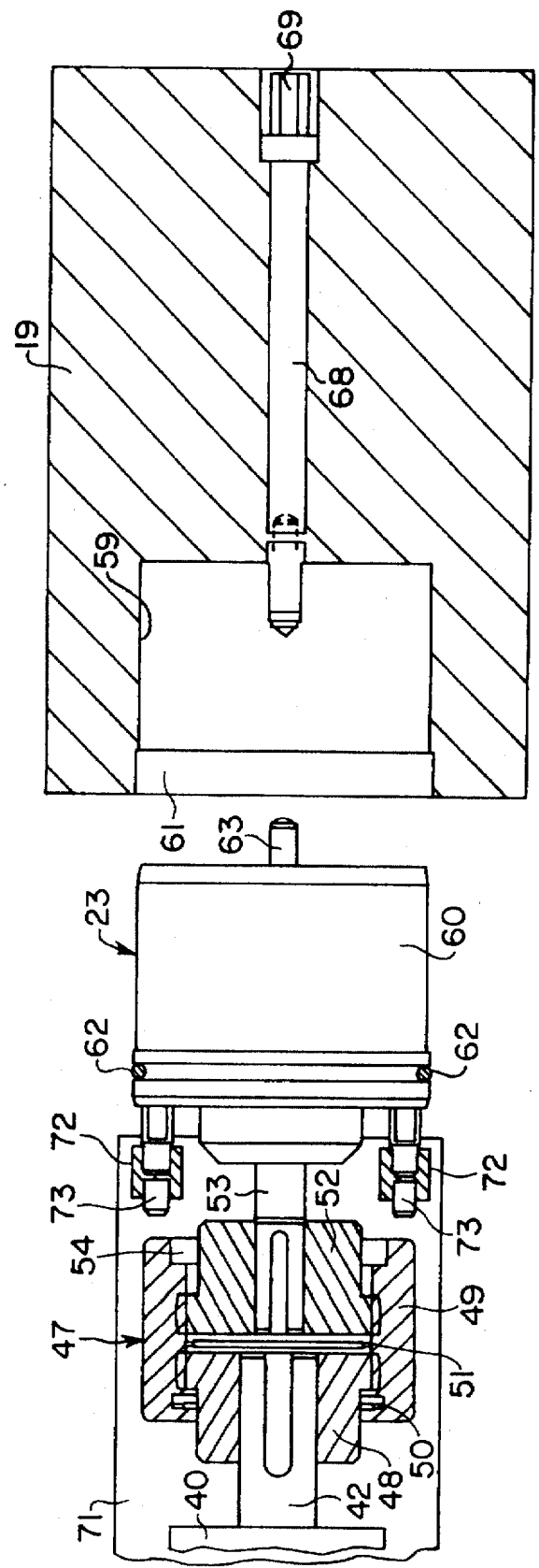
FIG. 7 is a top sectional view similar to FIG. 6 showing the removal of the pump from the manifold assembly.

The drive shaft 42 is connected to a dual gear coupling 47 which is shown in more detail in FIG. 5-7. The coupler 47 includes a drive gear 48 which is mounted on the drive shaft 42 using a keyway. The drive gear 48 engages an internal gear 49 which mounted for rotation with the drive gear. The drive gear 48 is captured within the internal gear 49 by means of two lock rings 50 and 51. The lock rings 50 and 51 restrict longitudinally movement of the drive gear 48 with respect to the internal gear 49. The internal gear 49 drives a driven gear 52 mounted by a keyway on a shaft 53. The coupling output shaft 53 extends into the coupling 47 at the opposite end from the drive shaft 42 and generally coaxially with the input shaft. The driven gear 52 is not captured within the internal gear 49, and, in fact, the driven gear is capable of substantial axial movement with respect to the internal gear. An enlarged opening 54 is provided at one end of the internal gear 49 for the driven gear 52. The coupling input and output shafts 42 and 53 can thus move along their axes toward and away from each other, since the coupling 47 accommodates such movement by movement of the gear 52 relative to the gears 48 and 49, and the coupling and thus permits movement of the pump 23 relative to the drive assembly 24 when the pump is being moved into and out of the pump cavity. While the coupling input and output shafts 42 and 53 are generally coaxial, the coupling 47 allows for some relative movement between the two shafts away from this axis by means of the enlarged opening 54, and thus also accommodates misalignments of the input and output shafts.

The output shaft from the coupling is the input shaft 53 for the pump 23. The pump 23 fits within a corresponding pump cavity 59 formed in the manifold block 19. The pump has an outer casing 60. The pump 23 is preferably a metering gear pump having an inlet on the periphery and having a central outlet, and is preferably a double gear pump. Any suitable submerged-gear-type pump may be used. The pump 23 is normally positioned in the pump cavity 59 within the manifold block. The pump cavity 59 has an open rearward end 61 to permit removal of the pump 23 from the manifold block 19. An O-ring 62 is provided around the interior surface of the cavity near the open end 61 of the cavity to seal the pump casing 60 to the manifold block 19 and prevent leakage of thermoplastic material during pumping. A positioning pin 63 is provided on the forward surface of the pump casing 60, and the pin engages a corresponding hole in the forward interior surface of the cavity 59 when the pump is in place. The pin 63 holds the pump 23 in position when the pump is in the cavity and restrains the pump casing 60 from rotating in the cavity when the pump is being driven by the motor.

The pump 23 is removably held within the manifold block 19 by a positioning and moving device which comprises a screw 68 extending from the front of the manifold block to the pump cavity 59 and into a corresponding threaded hole in the center of the pump casing. The "screw" 68 may be a bolt or any other threaded device which, when it engages the pump casing, moves the pump horizontally into and out of the cavity 59. Alternatively, any other device may be used to impart horizontal movement to the pump within the cavity, although a screw device is preferred. The head 69 of the screw 68 is accessible from the front panel of the manifold block 19. When the screw 68 is turned in one direction, e.g., counterclockwise, it pushes the pump 23 rearwardly and out of the pump cavity 59. When the screw 68 is turned the other direction, e.g., clockwise, it pulls the pump 23 into the pump cavity 59. The screw 68 provides the initial movement of the pump 23 for removal and the final movement of the pump for replacement, with the remaining removal or replacement movement of the pump 23 provided by the movement of the slidable carriage 25. In withdrawing the pump 23 from the cavity 59, the initial movement of the pump provided by the screw 68 facilitates the initial axial movement of the shaft 53 into the coupling 47, and it assists in moving the pump clear of the O-ring 62 in the cavity to overcome suction created as the pump moves past the O-ring, which suction tends to hold the pump in the cavity 59.

After the initial movement of the pump 23 provided by the screw 68, additional movement of the pump in removal from the cavity 59 and replacement into the cavity is provided by the carriage 25. A support bracket 71 comprising a pair of vertically extending support posts 72 extends from the front of the carriage 25 and is used to support the pump 23 when the pump is removed from the manifold block 19. Positioning and support pins 73 are provided on the pump casing 60 which can engage corresponding openings on the support posts 72 so that the pump 23 can be stably positioned and held on the bracket 71. A spring-loaded locking pin is provided extending into each of the openings on the support posts 72 to hold the support pin 73 removably in the opening.

To remove the pump from the manifold assembly 18 the user turns the screw 68 by using an appropriate tool from the front of the manifold assembly 18. Turning the screw 68, e.g., in the counterclockwise direction, causes the pump 23 to be pushed rearwardly from the pump cavity 59 through the open end 61. After the pump 23 is pushed free of the O-ring 62 around the rear of the pump cavity 23, the pump will disengage from the screw 68. The pump 23 is pushed onto the support bracket 71 with the support pins 73 which extend from the pump casing 60 engaging the corresponding openings on the posts 72, so that the pump is supported on the bracket. When each of the support pins 73 extend into the openings on the posts 72, the spring-loaded locking pins engaging the support pins 73 to hold the support pins securely to the posts. As the pump 23 is pushed from the cavity by the screw 68, the gear 52 which is mounted on the pump shaft 53 is pushed into the internal gear 49 of the coupling 47 to allow the pump 23 to be moved closer to the gear reducer 40. After releasing the brake by using the lever arm 37, the drive assembly 24 can then be moved rearwardly away from the manifold assembly 18 by movement of the slidable carriage 25 on the carriage support 26, to withdraw fully the pump 23 from the pump cavity 59. The pump 23 can then be serviced or replaced as necessary.

To replace the pump 23, the procedure is reversed. The carriage 25 is moved toward the manifold assembly 18. As the carriage 25 approaches the manifold assembly, the pump 23 is inserted into the pump cavity 59 through the open end 61. Before the pump 23 is fully inserted into the cavity, the screw 68 engages the threaded hole on the front of the pump casing 60. The screw 68 is then turned from the front of the manifold assembly 18 to pull the pump further into the pump cavity 59 and to secure the pump in place. As the pump 23 is pulled into the cavity 59 by the action of the screw 68, the pump is pulled from its support on the bracket 71, the spring-loaded locking pins on the posts 72 release the support pins 73 from the openings in the posts, and the gear 52 is pulled within the coupling 47 to accommodate this movement and provide the necessary extension on the pump shaft 53. The lever arm 37 can then be used to engage the brake to secure the carriage 25 in place on the carriage support 26 and to prevent inadvertent rearward movement of the carriage while the system is in operation.

The present invention also permits disconnection and removal of the motor 39 and gear reducer 40 from the system without removing the pump 23. If it is desired to replace or service the motor 39 or the gear reducer 40, this can be accomplished without removing the pump and without draining the system of material by disconnecting the motor drive from the pump at the coupling 47. The driven gear 52 can be removed from the coupling through the opening 54, and this permits rapid disconnection and subsequent re-connection of the pump shaft 53 from the coupling 47 without disturbing the pump.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is inconsistent with the extent to which the progress in the art has been advanced by the invention.

What is claimed is:

1. A system for supplying melted thermoplastic material to a dispenser, which comprises:
   a hopper for storing the thermoplastic material;
   a heating grid associated with the hopper for heating and melting the thermoplastic material;
   a reservoir into which the melted material flows from the grid;
   a manifold assembly connected to the reservoir into which the melted material flows, the manifold assembly including connections for supplying the material to a dispenser, the manifold assembly including a pump cavity;
   a pump mounted in the pump cavity and capable of being removed from the pump cavity;
   a drive assembly connected to drive the pump; and
   a movable carriage supporting the drive assembly, the carriage capable of movement toward and away from the manifold assembly to remove the pump from the cavity and to replace the pump into the cavity.

2. A system for supplying melted thermoplastic material, as defined in claim 1, wherein the carriage includes a support for the pump to permit the pump to be supported on the carriage when it is removed from the manifold assembly.

3. A system for supplying melted thermoplastic material, as defined in claim 1, wherein the cavity is open at one end to permit the pump to be withdrawn from the cavity through the open end.

4. A system for supplying melted thermoplastic material, as defined in claim 1, wherein the drive assembly has an axis, and comprising in addition a coupling connecting the drive assembly to the pump, the coupling accommodating movement of the pump in a direction generally parallel to the axis of the drive assembly.

5. A system for supplying melted thermoplastic material, as defined in 4, wherein the coupling also accommodates movement of the pump in a direction generally perpendicular to the axis of the drive assembly.

6. A system for supplying melted thermoplastic material, as defined in claim 1, comprising in addition a positioning and moving device connecting the pump to the pump cavity, the device adapted for pushing the pump from the pump cavity when the pump is removed and for pulling the pump into the pump cavity when the pump is replaced.

7. A system for supplying melted thermoplastic material to a dispenser, which comprises:
   a hopper for storing the thermoplastic material, the hopper having an outlet;
   a heating grid at the outlet of the hopper for heating and melting the thermoplastic material;
   a reservoir into which the melted material flows from the grid;
   a manifold assembly connected to the reservoir into which the melted material flows, the manifold assembly including connections for supplying the material to a dispenser, the manifold assembly including a pump cavity;
   a pump mounted in the pump cavity and capable of being moved within the pump cavity;
   a drive assembly connected to drive the pump; and
   a positioning and moving device extending through the pump cavity and connecting the pump to the pump cavity, the device adapted for pushing the pump from the pump cavity to remove the pump from the cavity for pulling the pump into the pump cavity to replace the pump.

8. A system for supplying melted thermoplastic material, as defined in claim 7, wherein the cavity is open at one end to permit the pump to be withdrawn from the cavity through the open end.

9. A system for supplying melted thermoplastic material to a dispenser, which comprises:
   a hopper for storing the thermoplastic material, the hopper having an outlet;
   a heating grid at the outlet of the hopper for heating and melting the thermoplastic material;
   a reservoir into which the melted material flows from the grid;
   a manifold assembly connected to the reservoir into which the melted material flows, the manifold assembly including connections for supplying the material to a dispenser, the manifold assembly including a pump cavity:
   a pump mounted in the pump cavity and capable of being moved within the pump cavity:
   a drive assembly connected to drive the pump, the drive assembly having an axis;
   a positioning and moving device connecting the pump to the pump cavity, the device adapted for pushing the pump from the pump cavity to remove the pump from the cavity for pulling the pump into the pump cavity to replace the pump; and
   a coupling connecting the drive assembly to the pump, the coupling accommodating movement of the pump in a direction generally parallel to the axis of the drive assembly.

10. A system for supplying melted thermoplastic material, as defined in 9, wherein the coupling also accommodates lateral movement of the pump in a direction generally perpendicular to the axis of the drive assembly.

11. A pump assembly for supplying material to a dispenser, which comprises:
   a manifold assembly for receiving the material from a source, the manifold assembly including connections for supplying the material to the dispenser, the manifold assembly including a pump cavity;
   a pump mounted in the pump cavity and capable of being removed from the pump cavity and replaced into the pump cavity;
   a positioning and moving device connecting the pump to the pump cavity, the device adapted for pushing the pump from the pump cavity when the pump is removed and for pulling the pump into the pump cavity when the pump is replaced;
   a drive assembly connected to drive the pump; and
   a movable carriage supporting the drive assembly, the carriage capable of movement toward and away from the manifold assembly to remove the pump from the cavity and to replace the pump into the cavity.

12. A pump assembly for supplying material, as defined in claim 11, wherein the carriage includes a support for the pump to permit the pump to be supported on the carriage when it is removed from the manifold assembly.

13. A pump assembly for supplying material, as defined in claim 11, wherein the cavity is open at one end to permit the pump to be withdrawn from the cavity through the open end.

14. A pump assembly for supplying material, as defined in claim 11, comprising in addition a coupling connecting the drive assembly to the pump, the coupling accommodating movement of the pump toward and away from the drive assembly.

15. A pump assembly for supplying material, as defined in 14, wherein the coupling also accommodates lateral movement of the pump with respect to the drive assembly.

* * * * *

UNITED STATES PATENT AND TRADEMARK OFFICE
CERTIFICATE OF CORRECTION

PATENT NO : 5,699,938
DATED : December 23, 1997
INVENTOR(S) : Shahid A. Siddiqui et al.

It is certified that error appears in the above-identified patent and that said Letters Patent is hereby corrected as shown below:

Column 8, line 54, at the end of the line, the colon ":" should be a semicolon --;--.
Column 8, line 56, at the end of the line, the colon ":" should be a semicolon --;--.

Signed and Sealed this

Seventh Day of April, 1998

Attest:

BRUCE LEHMAN

*Attesting Officer*  *Commissioner of Patents and Trademarks*